P. RICHARD.
TIRE PROTECTOR.
APPLICATION FILED JUNE 5, 1917.
1,261,621.
Patented Apr. 2, 1918.
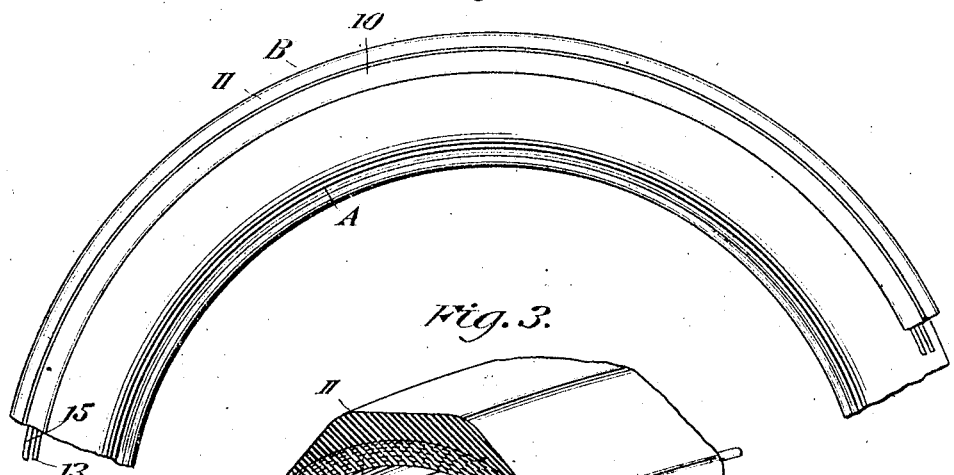
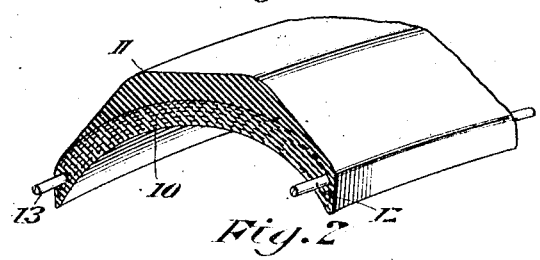
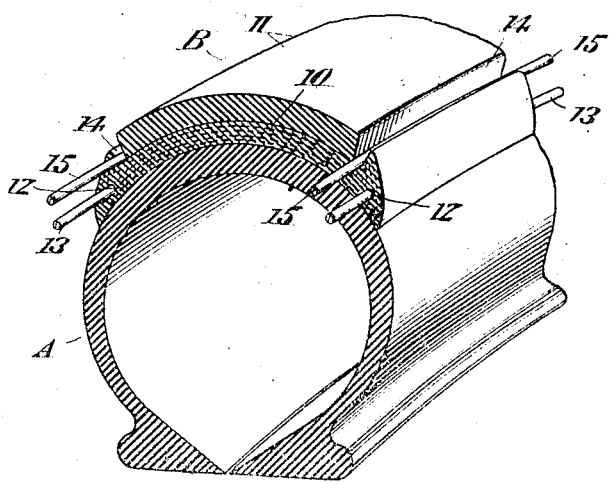
WITNESSES
INVENTOR
Peter Richard
BY Victor J. Evans
ATTORNEY

UNITED STATES PATENT OFFICE.

PETER RICHARD, OF DETROIT, MICHIGAN.

TIRE-PROTECTOR.

1,261,621.  Specification of Letters Patent.  Patented Apr. 2, 1918.

Application filed June 5, 1917. Serial No. 172,974.

*To all whom it may concern:*

Be it known that I, PETER RICHARD, a citizen of the United States, residing at Detroit, in the county of Wayne and State of Michigan, have invented new and useful Improvements in Tire-Protectors, of which the following is a specification.

This invention comprehends the provision of a pneumatic tire protector, designed to be quickly and easily associated with a tire, or removed therefrom as the occasion may require, the protector when in use insuring the tire against wear and rendering the same puncture-proof, it being very simple in construction, cheap to manufacture, and efficient in its purpose.

The nature and advantages of the invention will be better understood when the following detail description is read in connection with the accompanying drawing, the invention residing in the construction, combination and arrangement of parts as claimed.

In the drawing forming part of this specification like numerals of reference indicate similar parts in the several views and wherein:—

Figure 1 is a fragmentary side elevation of a tire showing the auxiliary tread applied thereto.

Fig. 2 is a sectional perspective view of a pneumatic tire with my invention associated therewith.

Fig. 3 is a transverse sectional view through a modified form of the invention.

Referring more particularly to the drawing in detail A indicates a pneumatic tire of usual construction, while the protector forming the subject matter of my invention is indicated generally at B.

The protector is preferably made up of a circumferential piece of suitable material 10, such as the fabric generally used in tire production, this fabric being curved to conform to the shape of the tire, and of proper dimensions to extend well beyond the opposite side of the tread of the pneumatic tire A with a view of fully protecting the latter. The fabric 10 has secured thereto the tread proper which is indicated at 11, and which may be constructed from any material most suitable for the purpose intended, although by preference rubber is used for this purpose. The tread proper is preferably of uniform thickness, while the combined thickness of the fabric 10 and the tread 11 is such as to fully protect the tread of the pneumatic tire from injury, and assures the same against puncture.

The fabric portion 10 of the protector is formed adjacent its opposite edges with a circumferential bore 12 in which is arranged a resilient wire ring 13, the purpose of which will be presently stated. The protector is further provided at the point of juncture between the fabric 10 and the tread portion 11, with external grooves 14 in which is removably fitted a resilient ring 15 similar to the ring 13. These rings are so disposed relatively, and also with respect to the protector, that they serve to effectively maintain the protector in proper position upon the pneumatic tire A, while the resiliency of the rings permits the tire proper to yield when traveling over obstacles, or irregular surfaces.

The protector in its entirety is made of different sizes for different size tires, and when use of the protector is desired, the tire is first deflated, and the protector subsequently properly positioned about the tread of the tire. The tire is then inflated, and when inflated to a proper extent, engages the protector in a way to hold the latter in proper position thereon. The resilient rings however materially assist in this capacity. Both the rings 13 and 15 may be used, or if desired only one set of rings need be employed. It is of course manifest that with the rings 15 associated with the protector in the manner shown, that these rings may be readily and quickly separated from the protector, when the latter has become worn beyond use, and the rings again used in connection with the substitute protector. With the protector positioned about a tire in the manner illustrated in Fig. 2, the tire is guarded against wear to a maximum degree, and also rendered puncture-proof. The protectors can be manufactured and sold at a comparatively small cost, and can be easily and quickly placed upon a tire or removed therefrom. It is only necessary to deflate the tire in order to remove the protector therefrom as will be readily understood.

While it is believed that from the foregoing description, the nature and advantages of the invention will be apparent, I desire to have it understood that I do not limit myself to what is herein shown and described, and that such changes may be resorted to when desired as fall within the scope of what is claimed.

What is claimed is:—

An auxiliary tire tread for pneumatic tires comprising an endless band of fabric curved transversely to conform to the curvature of the tire, said fabric being formed at the opposite sides to provide relatively thick beads, a circumferential piece of rubber secured to the fabric and constituting the tread proper, resilient rings embedded in said beads of the fabric, said rubber tread having its opposite side edges terminating in spaced relation to said beads of the fabric and defining grooves by the intervening space between said parts, and resilient rings seated within said grooves for the purpose specified.

In testimony whereof I affix my signature.

PETER RICHARD.